March 29, 1932.  J. W. WHITE  1,851,226
FLUID CONTROL TANK
Filed Jan. 24, 1927   2 Sheets-Sheet 1

Inventor
JOHN WILLIAM WHITE
By Clarence S. Walker
HIS Attorney

March 29, 1932.                J. W. WHITE                 1,851,226
                            FLUID CONTROL TANK
                    Filed Jan. 24, 1927         2 Sheets-Sheet 2

Inventor
JOHN WILLIAM WHITE
By Clarence E. Walker
HIS Attorney

Patented Mar. 29, 1932

1,851,226

UNITED STATES PATENT OFFICE

JOHN WILLIAM WHITE, OF BUFFALO, NEW YORK

FLUID CONTROL TANK

Application filed January 24, 1927. Serial No. 163,142.

This invention relates to an improvement in a fluid control tank, and more particularly to a tank which forms a part of a fluid system by means of which power is transmitted from one point to another.

The use of a fluid system to actuate mechanism by means of pressure created in the system by a plunger is old and well known. This system, however, presents certain difficulties, which up to the present time have not been satisfactorily surmounted. The fluid ordinarily used is a mixture of glycerine and alcohol, or a mixture of castor oil and alcohol. Such mixtures expand or contract with the temperature, thus causing a variation in the volume and consequently in pressure. Furthermore, since the usual system includes a plurality of joints or connections there is danger of leakage which will decrease the volume of the fluid.

When the volume of fluid decreases for any reason in a system including a plunger, it is obvious that the travel of the plunger must be increased in order to insure an application of the normal amount of pressure by the system. On the other hand when the volume of fluid increases for any reason the result is of course an increase in pressure which would be transmitted to the mechanism, and would actuate it when not desired.

The decrease in the fluid volume can, in a system of the prior type, be corrected only by supplying additional fluid thereto, usually by means of a pump. This, however, is only done when there is a considerable decrease in volume, and cannot be used to correct variations due to changes in temperature.

The increase in fluid volume has previously been taken care of by providing an appreciable lost motion or leeway in the system, as for instance in the plunger operating means.

The primary object of this invention is to provide in such fluid system means which will automatically correct any variation in the volume, thus insuring a constant relation of all parts when the system is at rest.

Another object of this invention is to provide in a fluid system an auxiliary mechanism operated by the fluid in the system, which mechanism automatically compensates for variations in the fluid in the system.

A further object of this invention is to provide in a fluid system including a plunger by which pressure is applied to the fluid, an auxiliary mechanism operated upon each movement of the plunger to compensate for variations in the volume of the fluid in the system.

A still further object of this invention is to provide in a fluid system means for automatically injecting additional fluid into said system from a supply under atmospheric pressure and returning any excess over a constant volume of fluid to said supply.

Other objects of this invention will appear from a consideration of the following description taken in connection with the drawings which form a part thereof, and in which Fig. 1 is a front elevation of one embodiment of this invention, installed in an automotive vehicle;

Figures 1, 3:
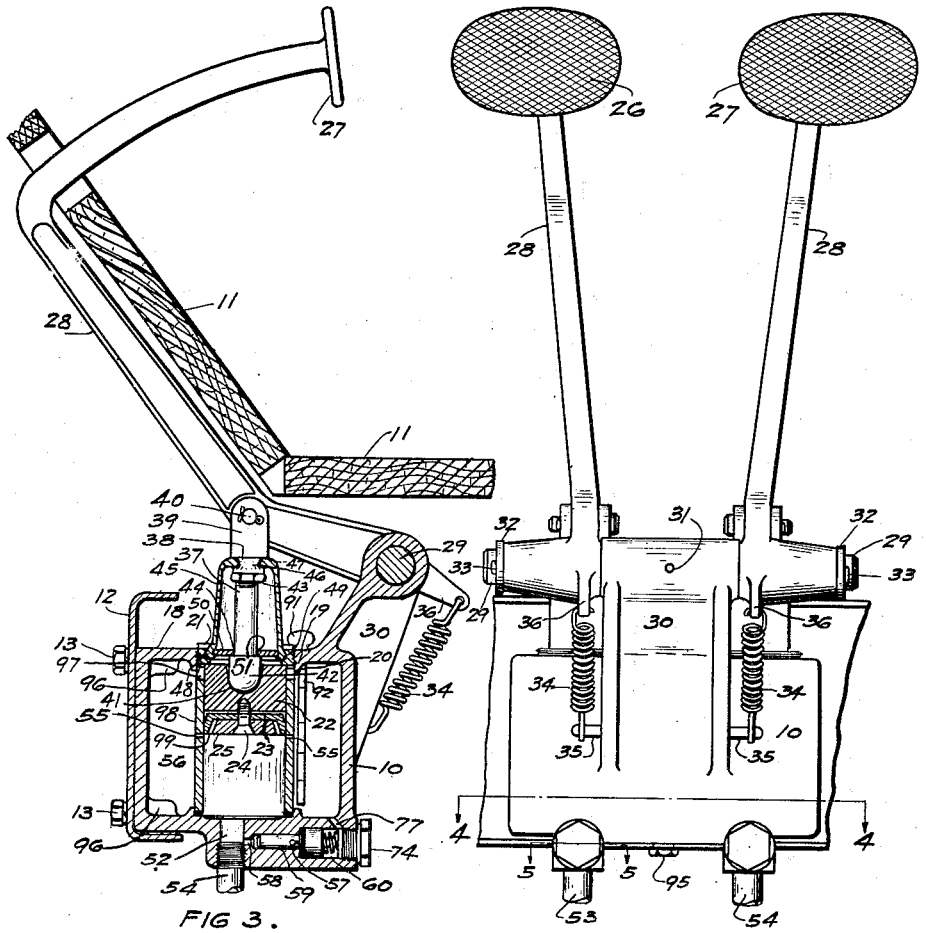
Fig. 3 is a cross sectional view taken along the line 3—3 of Figure 2.
Figure 2:
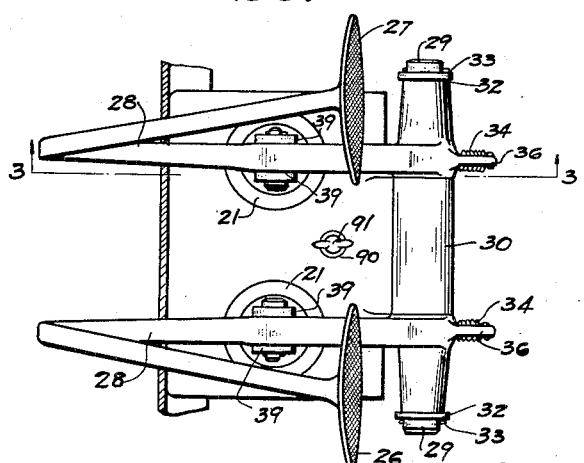
Fig. 2 is a top plan view of such embodiment.

The embodiment of this invention selected for the purpose of illustration is that adapted for use in an automotive vehicle to control a fluid operated clutch and a fluid operated brake. It will be understood that the use of this invention is not limited to this particular type of installation, and that a tank embodying this invention can be used wherever it is desired to control by fluid means the operation of mechanism, and more especially where it is essential to maintain the volume of the fluid in the system so that the operating pressure is kept at a predetermined point, regardless of any change in conditions.

Instead of using this tank for the control of clutch and braking systems on a motor vehicle it can be employed for example on shipboard, where the motion of the control lever at the bridge is transmitted to the boiler room by fluid means, in film coating machines where the travel of a hydraulic ram must be kept uniform at all times, in tire setting machines or in hydraulic presses—in fact, in any installation where the length of movement depends upon the volume of the liquid in the system.

In the drawings is shown a tank 10, which embodies one form of this invention. The tank 10 is mounted below the floor and foot boards 11 of a motor vehicle upon a beam 12. The beam 12 functions to support the rear end of a motor (not shown) and the tank is secured thereto by means of bolts 13, which in the present instance engage the upper and lower corners of the front face of the tank. The tank is thus located between the motor and the clutch at the driver's side of the vehicle, being secured to an element, the motor support 12, which is present in all motor vehicles.

This location has two distinct advantages: first, very little heat from the motor reaches it, but on the contrary it is kept cool by the air stream due to the motion of the vehicle; and second, it is at the highest point in the system and therefore any vapor which would build up pressure in the system will arise into the tank and be taken off by the means described hereinbelow.

In the tank 10 are mounted two cylinders 14 and 15, fixed in place by any suitable means. In the drawings the bottom 16 of the tank 10 is provided with annular bosses 17, which receive and surround the lower ends of the cylinders 14, 15. Through the top 18 of the tank 10, directly above the bosses 17, are formed circular holes 19, through which the cylinders 14, 15, are inserted into the tank. On the underside of the top 18 around the holes 19 are formed flanges 20, which surround the upper ends of the cylinders 14, 15. The cylinders thus properly located are fixed in place by rings 21 threaded into the holes 19, and bearing upon the upper edges of the cylinders 14, 15. Suitable gaskets or packing may be provided if desired, in order to seal the cylinders from the main body of the tank.

Mounted to reciprocate in each cylinder 14 and 15 is a plunger 22, having on its bottom face a rubber cup 23, secured thereto by a screw 24 through a disc 25. In the present embodiment the plunger 22 in the cylinder 14 is actuated by a clutch pedal 26 and the plunger 22 in the cylinder 15 is actuated by a brake pedal 27. Since the connecting mechanism is the same in both, only one will be described in the detail.

The pedals 26, 27 include levers 28 pivoted upon a rod 29 carried by, and projecting at each side of a support 30, here shown as integral with the tank 10. The rod 29 is held against rotation by a pin 31 and the levers 28 may be retained thereon by washers 32 and cotter pins 33. Springs 34 attached to studs 35 on the support 30, and to fingers 36 on the levers 28 hold the pedals normally in the up position, as shown in the drawings.

Each plunger 22 is operated by a connecting rod 37, having at its upper end a yoke 38. The arms 39 of the yoke extend at each side of the lever 28, and are fixed thereto by pins 40, so that each rod 37 is pivotally suspended from a lever 28. In the upper face of each plunger 22 is formed a socket 41, into which enters a ball 42 at the lower end of the rod 37. The yoke 38 is threaded onto the shaft 43 of the rod 37, so that the length of the rod 37 can be accurately determined. The rod 37 passes through the center 44 of the ring 21, which is closed by a flexible sleeve 45. The contracted upper end 46 of the sleeve 45 enters a pocket 47 in the yoke 38, while the expanded lower end 48 enters an annular groove 49 in the ring 21, being held therein by a plate 50 having at the center an orifice 51, through which the rod 37 passes. It will be noted that there is no positive connection between the rod 37 and the plunger 22, for a purpose which will appear hereinbelow.

Through the bottom 16 of the tank 10 are formed passages 52, which lead from each cylinder 14 and 15, and into which are threaded pipes 53, 54, of the clutch operating system and the brake operating system respectively. The cylinders 14, 15 are thus parts of the fluid systems, the portions below the plungers being in direct communication therewith and filled with fluid, so that the advance stroke of a plunger will force the fluid in its cylinder into the pipe and thus transmit that pressure to the mechanism (not shown) arranged to be actuated thereby.

In the walls of the cylinders 14, 15 are formed a plurality of ports 55, by which the cylinders are in open communication with the reservoir 56 of the tank 10. The ports 55 are so located that they are uncovered only when the plunger 22 is at its upward limit of movement (see Figure 3). Obviously, when the plunger 22 is depressed by means of a lever 28, the ports 55 are closed, so that the fluid in the cylinder can escape only through the passage 52 at the bottom into the pipe 53 or 54. When the lever 28 is released the pedal is returned to the upright position by the spring 34, and since there is no direct connection between the rod 37 and the plunger 22, the rod will be drawn to the position shown in Figure 3. The plunger 22 is returned independently by the pressure of the fluid in the system, of which it is a part.

As previously pointed out it is the common practice in fluid systems to use either a mixture of glycerine and alcohol or a mixture of castor oil and alcohol. Since such mixtures expand and contract very readily with any change of temperature, this is very objectionable because it means that the position of the pedal will vary according to the temperature. Hence a certain amount of leeway must be allowed to correct this condition and also to take care of any leakage. In the ordinary system, in order to bring the pressure back to normal additional fluid must be pumped into the line. Obviously this cannot be done to correct a decrease in volume due to a variation in temperature, because, if after the additional fluid has been pumped into the line, the temperature varies so that the fluid expands, the result will be a surplus of pressure in the system, and consequently interference with the free action of the mechanism controlled thereby.

The device or auxiliary mechanism now to be described, automatically keeps the system up to a proper volume at all times, eliminating any leeway or extra pedal movement and automatically relieving any pressure in the system that might arise by any increase in volume of the fluid, due to heat.

Figure 5:
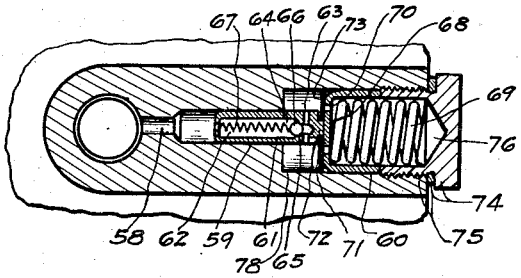
Fig. 5 is an enlarged sectional view taken along the line 5—5 of Figure 1.
Figure 4:
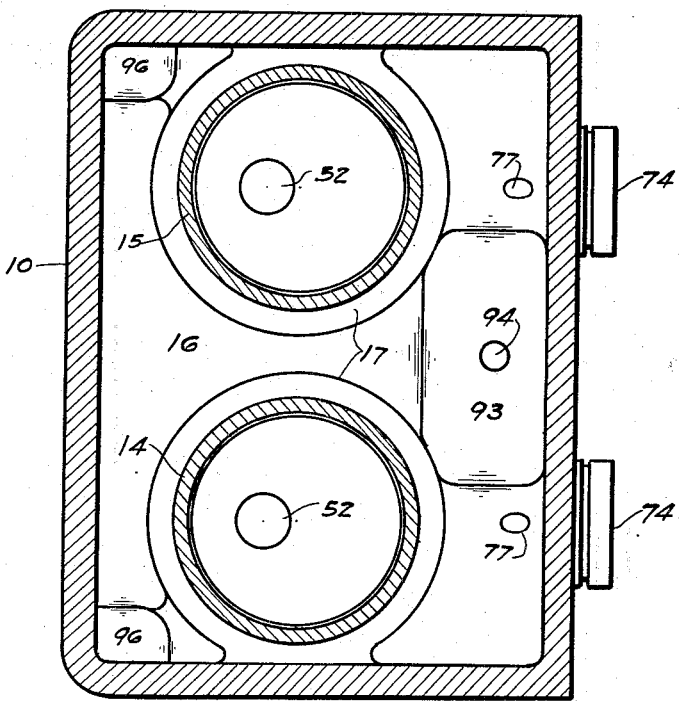
Fig. 4 is an enlarged sectional plan view taken along the line 4—4 of Figure 1.

In the base of the tank 10 opening into each of the passages 52 is a chamber 57, shown in cross section in Figures 3 and 5, and there shown as having three different compartments 58, 59 and 60 varying in diameter, the smallest of which 58 is at all times in direct connection with the passage 52.

In the compartment 59 is mounted a piston 61, within which is provided a passage 62 in direct connection with the compartment 58, and a plurality of ports 63 at right angles to the passage 62. The connection between the passage 62 and the ports 63 is controlled by a valve 64, which comprises a seat 65, on which a ball 66 is normally held by a spring 67. The outer end of the piston 61 butts against a cup 68 in the compartment 60, which is at all times in contact with the piston 61, being held in such position by means of a spring 69. Suitable ports 70 connect the interior of the cup 68 with the portion of the compartment 60, into which the ports 63 lead. The outer end of the piston 61 is reduced to provide a tip 71 terminating in a shoulder 72. On the tip is supported a plate 73, which has a certain limited movement of translation, and which when in contact with the cup 68 closes the ports 70.

The chamber 57 is closed by a cap 74, preferably threaded into the mouth of the chamber, and provided with a gasket 75 to insure sealing, and having a pocket 76 in which the spring 69 seats. Comparing Figures 3 and 5 it will be noted that the parts in the chamber 57 are shown in Figure 3, in the inoperative position, which they will occupy when the plunger 22 is raised and in Figure 5 in the advanced position, which they will take when the plunger is advanced. The compartment 60 is directly connected with the reservoir 56 of the tank by a conduit 77.

The parts will operate in the following manner:

When the plunger 22 is advanced a certain portion of the fluid within the cylinder will pass through the compartment 58 into the compartment 59 and force the piston 61 to advance, thus advancing the cup 68 against the action of the spring 69. This movement of the cup 68 creates a pocket 78 in the compartment 60, and the different in pressure between the fluid in the cup 68 and the pocket 78 forces the plate 73 away from the cup 68 uncovering the ports 70, and thus allowing the fluid to flow into the pocket 78.

When the pressure on the plunger 22 is released and the return stroke of the plunger begins, the pressure in the chamber 57 drops to normal and the spring 69 functions to shift the cup 68 back to the position shown in Figure 3. This causes the plate 73 to close the ports 70 and forces the fluid in the pocket 78 through the ports 63 against the valve 64, which opens, admitting it into the passage 62 in the piston 61, and thence it is injected into the passage 52, and the cylinder. If this injected fluid results in an excess amount of fluid in the system, it insures the return of the plunger 22 to its upper limit of movement, as shown in Figure 3, thus uncovering the ports 55, and allowing the excess fluid to return to the reservoir and restoring the system to the normal condition.

By this auxiliary mechanism each stroke of the plunger 22 without the necessity of any attention whatsoever on the part of the operator causes the injection of added fluid, and when the proper volume has been reached the excess is taken care of automatically. Moreover, any increase in pressure in the system, due to any change in temperature which would cause the fluid to expand is, of course, relieved by the ports 55, which are uncovered when the system is normal and at rest, permitting any excess fluid to enter the reservoir 56.

Figure 6:
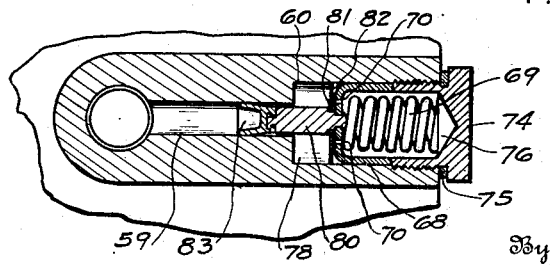
Fig. 6 is a view similar to Figure 5, illustrating another form of control mechanism, that might be employed, if desired.

In place of the piston 61 the piston 80, shown in Figure 6, may be employed. This piston 80 is rigidly secured to the base of the cup 68 and is provided with a recess 81, which allows a certain amount of play in the valve plate 82, by which the ports 70 are covered and uncovered. At the inner end of the piston 80 is secured a cup 83, which is soft rubber, and which acts both as a piston and as a check valve. In this construction the compartment 58 is omitted and the compartment 59 is continued to enter the passage 52. When the plunger 22 is depressed a certain amount of the fluid in the chamber will enter the compartment 59, and force the piston 80 to advance compressing the spring 69, thus uncovering the ports 70 and allowing the fluid in the compartment 60 to enter the pocket 78.

The cup 83 being of soft rubber will expand against the walls of the compartment 59, thus preventing any escape of the fluid into the compartment 60 from the compartment 59 past the cup 83. Figure 6 shows this device in the position just described.

When the plunger 22 returns the spring 69 forces the cup 68 back into its normal position, closing the ports 70 and forcing any fluid in the pocket 78 past the cup 83 into the compartment 59. The piston 80 is appreciably smaller in diameter than the compartment 59, so that the fluid can flow around the same and against the cup 83. Since the cup is of soft rubber it will contract sufficiently to allow the fluid to flow past it into the compartment 59, and thence be injected into the passage 52.

The tank 10 is provided with a filling opening 90, normally sealed by a plug 91 having a gauge rod 92 attached thereto, whereby the amount of fluid in the reservoir 56 can be ascertained from time to time.

In the bottom 16 of the tank is formed a sump or catch basin 93, from which leads an outlet 94 sealed by a plug 95. Bosses 96 are formed on the front wall of the tank to receive the fastening bolts 13.

The plungers 22 rest or float upon the fluid in the cylinders 14, 15, and hence there is under ordinary conditions no tendency for the fluid to escape past them. Should, however, any fluid pass a cup 23 and rise in the space between the plunger 22 and the cylinder wall, it will return to the reservoir 56 through ports 97 provided in the cylinder walls. This would happen if the reservoir 56 were filled above the ports 55.

Between each disc 25 and the side wall 98 of each cup 23 is an annular space 99, the dimension of which can be varied as desired, since they are determined by the diameter of the disc 25. The space 99 contains air which is trapped therein when the system is filled and which cannot escape but is held in the space by the fluid. The air in the space 99 is acted upon directly by the fluid and transmits the pressure received to the wall 98, forcing it into contact with the wall of the cylinder and preventing the fluid from passing by the cup. This air, of course, is compressible to a certain degree and thus exerts a cushioned or yielding pressure upon the wall 98.

The embodiment herein set forth discloses the provision in a single tank of two cylinders, both of which are controlled from the reservoir 56. Prior to this invention it has always been thought necessary to provide a separate tank for each system, and the provision of a single tank which supplies a multiplicity of systems is, therefore, of considerable advantage. It will be understood, however, that the tank can be equally well employed to supply only a single system, and that the construction described and shown is applicable thereto.

While certain embodiments of this invention have been shown and described, applicant is not limited thereto, since it is obvious that other embodiments can be made without departing from the spirit and scope of this invention, as set forth in the following claims.

Having thus set forth my invention, what I claim as new and for which I desire protection by Letters Patent is:

1. In a control tank for a fluid system, a cylinder, a plunger adapted to reciprocate in said cylinder, an outlet passage from said cylinder into said system, through which passage fluid is forced from said cylinder by the advance stroke of said plunger, a chamber in said tank in direct connection with said passage, a piston in said chamber caused to advance on the advance stroke of said plunger, and to return upon the return stroke of said plunger, and means for supplying fluid into said chamber, which fluid is injected into said passage upon the return stroke of said piston.

2. In a control tank for fluid systems, a reservoir, a cylinder in said reservoir and connected thereto by ports in the walls of said cylinder, a plunger adapted to reciprocate in said cylinder, said ports being open when said plunger is retracted, an outlet passage connecting said cylinder to the rest of said fluid system, through which outlet passage fluid is forced upon the advance stroke of said plunger, a chamber opening into said passage, and means in said chamber for injecting fluid into said passage upon the return stroke of said plunger, any excess over the normal volume in said system escaping through said ports at the conclusion of the return stroke of said plunger.

3. In a control tank for fluid systems, a reservoir, a cylinder in said reservoir and connected thereto by ports in the walls of said cylinder, a plunger adapted to reciprocate in said cylinder, said ports being open when said plunger is retracted, an outlet passage connecting said cylinder to the rest of said fluid system, through which outlet passage fluid is forced upon the advance stroke of said plunger, a chamber opening into said passage, and means in said chamber, for injecting fluid into said passage upon the return stroke of said plunger, any excess over the normal volume in said system escaping through said ports at the conclusion of the return stroke of said plunger.

4. In a fluid system, a cylinder containing a fluid and having a passage communicating with a point of distribution, a plunger reciprocably mounted within the cylinder for forcing fluid therefrom to the point of distribution, a chamber communicating with the cylinder aforesaid on the compression side of the plunger, a piston in the chamber movable rearwardly upon the compression stroke of the plunger and forwardly upon the return stroke of the latter, means for supplying fluid to the chamber in rear of the piston, and means operable upon rearward movement of the piston to permit fluid in the chamber to flow into the side of the latter in advance of the piston whereupon forward movement of the piston effected by the return stroke of the plunger causes the fluid in the chamber to discharge into the cylinder.

5. In a fluid system, a cylinder containing a fluid and having a passage communicating with the point of distribution, a plunger reciprocably mounted within the cylinder for forcing fluid therefrom to the point of distribution, a chamber having a passage communicating with the passage aforesaid, a piston in the chamber movable rearwardly upon the compression stroke of the plunger and forwardly upon the return stroke of the latter, means for supplying fluid to the chamber in rear of the piston, means operable upon the return movement of the piston to permit fluid in the chamber to flow into the side of the latter in advance of the piston whereupon forward movement of the piston effected by the return stroke of the plunger causes fluid in advance of the piston to discharge into the second mentioned passage, and a combined piston and check valve in the latter passage and movable with said first piston for forcing the fluid in the latter passage into said first mentioned passage and operable to prevent fluid in the latter passage to flow into the chamber.

In testimony whereof I have affixed my signature.

JOHN WILLIAM WHITE.